S. H. LA RUE.

Cooking Stove.

No. 4,157.

Reissued Oct. 18, 1870.

Inventor
Silas Hoffman LaRue
by his atty
Marm Fenwick Pearce

Witnesses.
C. Campbell
J. W. Campbell

N. PETERS, Photo-Lithographer, Washington, D. C.

United States Patent Office.

SILAS HOFFMAN LA RUE, OF ALLENTOWN, PENNSYLVANIA.

Letters Patent No. 103,204, dated May 17, 1870; reissue No. 4,157, dated October 18, 1870.

IMPROVEMENT IN COOKING-STOVES.

The Schedule referred to in these Letters Patent and making part of the same

*To all whom it may concern:*

Be it known that I, SILAS HOFFMAN LA RUE, of Allentown, in the county of Lehigh and State of Pennsylvania, have invented certain new and useful Improvements in Cook-Stoves; and I do hereby declare that the following is a full, clear, and exact description thereof, reference being had to the accompanying drawing making part of the specification, in which—

Similar letters of reference indicate corresponding parts in the several figures.

Figure 1:
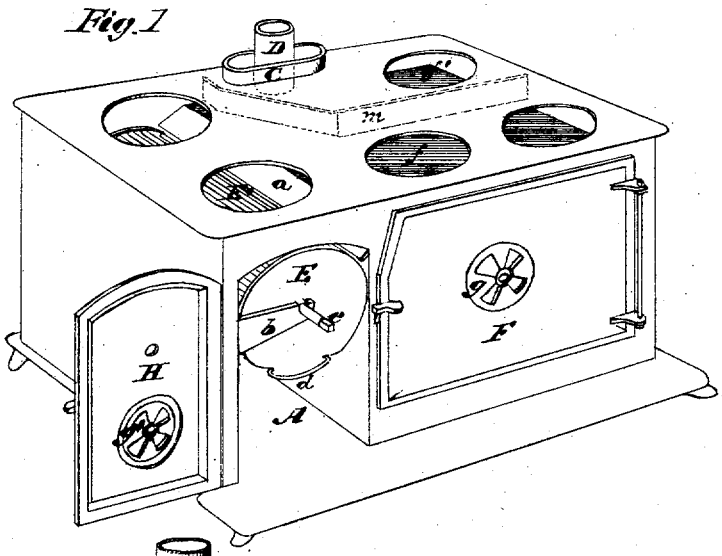
Figure 1 is a perspective view of the improved stove.

This invention relates to certain novel improvements in cooking-stoves wherein a revolving grate is employed, and also wherein the oven is made the the means for warming air to be conducted into adjacent rooms.

The first part of my invention consists in adapting a revolving grate to the fire-chamber of a cook-stove, by constructing the grate cylindrical, and arranging it below a contracted passage or outlet from the fire-chamber, whereby a grate of large capacity can be employed, and the products of combustion prevented from escaping too rapidly into the flue of the stove, as will be hereinafter explained.

The second part of my invention consists in the combination with a baking-oven of a revolving grate, so arranged in relation to the oven that heat radiated from the grate will impinge directly against one of the walls of said oven, as will be hereinafter explained.

The third part of my invention consists in providing for utilizing the oven as a means for warming air to be conducted to adjacent rooms, by carrying a pipe out of the top of the oven through the main flue of the stove, and providing such pipe and the door of the stove with valves or registers, for regulating or completely stopping the circulation of the air when desired, as will be hereinafter explained.

To enable others skilled in the art to understand my invention, I will explain its construction and operation.

The cooking-stove represented in the accompanying drawing has a single oven, O, arranged on one side of a fire-chamber, A, which latter extends from the top of the stove to its bottom, and contains a cylindrical grate, E E'.

This grate consists of two circular heads, E E, connected by fire-bars E', and provided with a slide, *d*, for allowing the introduction of fuel within the grate. In practice I shall have a similar slide in the bottom of this grate, so that the fire can be replenished, whether the top or bottom is uppermost.

In the center of each head is a trunnion, *e*. These are supported by suitable bearings, *b*, and the trunnion *e* which is nearest the door H is elongated, and adapted to receive a crank-handle, by which the grate can be oscillated or turned over at pleasure.

One object of this revolving grate is to consume the gas, which is effected by turning the grate up-side down after the fire is fully started. The fire will gradually burn down through the coal beneath it, and consume the gas passing up through it. Every time fresh fuel is supplied the grate is to be turned over.

Another object of this grate is to dispense with fire-brick, and allow the oven-wall next the fire-chamber to be exposed directly to the influence of the radiated heat from the isolated fuel in the grate. Thus, the oven can be safely heated, and a large quantity of heat utilized, which, with the fire-brick lining, would be carried out of the stove.

Another object of this grate is to allow the entire wall of the oven adjoining the fire-chamber to be exposed to the heating influence of the fire, which, with the horizontal stationary grate, is not the case.

Thus, it will be seen that the turning grate, as I have arranged it, is peculiarly applicable to the cooking-stove.

The grate is made cylindrical in order that it may be turned over in a space which is not much larger than the diameter of this grate. The stops *s s*, on the fire-chamber walls, and the stops *t t*, on the heads of the grate, will hold the latter steadily in place, either side up.

Above the grate or grated cylinder are two stationary shelves, *a a*, which overhang the grate, and contract the outlet-passage. These shelves operate as heat-arresters, and allow the oven-wall next the fire-chamber to be thoroughly heated. Without these shelves *a a* the oven would be subjected to sudden changes, owing to the influx of cool air into the fire-chamber through the draught-passage *g'* in the door H.

Figure 2:
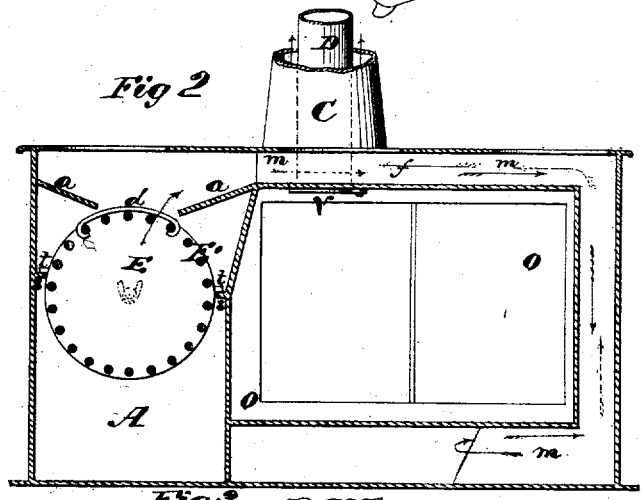
Figure 2 is a section taken vertically through the fire-chamber, ash-pit, oven, and main flue.
Figure 3:
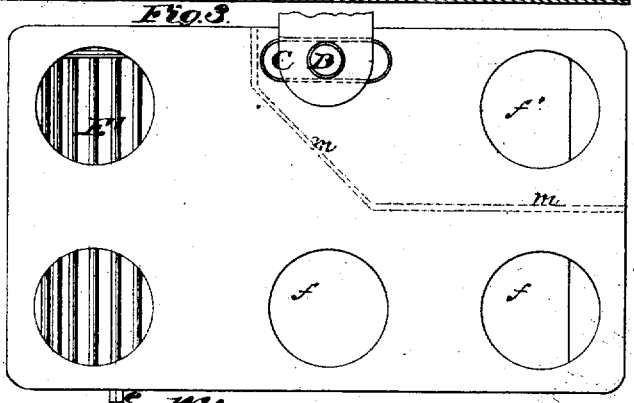
Figure 3 is a plan or top view of the stove.

The flue-partition *m* extends from the back wall of the stove, on one side of the escape-pipe C, forward for a short distance; thence to the end of the stove furthest from the fire-chamber; thence downward beneath the oven, as shown in figs. 1, 2, and 3.

This partition *m* thus forms a flue, *f*, leading from the fire-chamber over the oven, down one side thereof, and beneath the oven, to the commencement of a flue, *f'*, which conducts the products on the opposite side of said partition *m*, to the escape-pipe C.

Rising from the top wall of the oven O is a pipe, D, which passes up through smoke-pipe C, and is intended for conducting hot air to adjacent apartments for warming the same.

At the lower end of this pipe, inside of the oven, is a valve, V, and through the door F of the oven is an opening, provided with a register, *g*.

When the oven is used for baking, the valves V and *g* are shut; but when the oven is not used for this purpose, said valves are open, when cool air will enter the oven, become heated, and pass out through the pipe D into another room, or, if desired, into the same room in which the stove is arranged.

What I claim, and desire to secure by Letters Patent, is—

1. The shelves *a a* and turning grate E E′, in combination with the fire-chamber A, substantially as described.

2. The combination and arrangement, in a cooking-stove, of the turning grate E E′, pipes C D, and oven O, with an aperture in the latter communicating with a hot-air pipe, and a door provided with a damper, substantially as described.

SILAS HOFFMAN LA RUE.

Witnesses:
A. E. WITTMER,
FRANK T. GOOD.